United States Patent [19]
Albert et al.

[11] Patent Number: 5,870,722
[45] Date of Patent: Feb. 9, 1999

[54] APPARATUS AND METHOD FOR BATCH PROCESSING OF WIRELESS FINANCIAL TRANSACTIONS

[75] Inventors: Herb H. Albert, Bellevue, Wash.; Paul A. Renton, Sheridan, Oreg.; Stephen R. Schramke, Seattle, Wash.

[73] Assignee: AT&T Wireless Services Inc, Middletown, N.J.

[21] Appl. No.: 532,080

[22] Filed: Sep. 22, 1995

[51] Int. Cl.$^6$ .................................................. G06F 17/60
[52] U.S. Cl. ............................................................ 705/39
[58] Field of Search ................................... 395/216, 221, 395/239, 241, 244; 705/16, 21, 39, 41, 44

[56] References Cited

U.S. PATENT DOCUMENTS

| | | | |
|---|---|---|---|
| 3,892,948 | 7/1975 | Constable | 340/825.33 |
| 4,665,396 | 5/1987 | Dieleman | 340/825.34 |
| 4,926,325 | 5/1990 | Benton et al. | 340/825.33 |
| 5,231,570 | 7/1993 | Lee | 340/825.33 |
| 5,276,444 | 1/1994 | McNair | 340/825.33 |
| 5,357,614 | 10/1994 | Pattisam et al. | 395/250 |
| 5,485,510 | 1/1996 | Colbert | 340/825.33 |
| 5,491,325 | 2/1996 | Huang et al. | 235/379 |
| 5,500,890 | 3/1996 | Rogge et al. | 340/825.33 |

Primary Examiner—Gail O. Hayes
Assistant Examiner—Raquel Alvarez

[57] ABSTRACT

Disclosed are methods for providing electronic settlement of authorized financial transactions via a wireless transmission system. A conventional financial transaction processing point-of-sale terminal is connected to a wireless adapter. The wireless adapter is connected to a wireless transmission system, through which the adapter can communicate with a host computer. Transaction authorizations are processed via the wireless adapter, wireless transmission system and the host computer. A main transaction database is maintained by the host computer, and the adapter maintains a database of transactions which have been authorized but not yet settled. When the terminal initiates a settlement procedure, the adapter and the terminal communicate so that the adapter collects from the terminal all the transactions which are to be settled before initiating the settlement procedure with the host computer. The adapter compresses the data blocks which carry the settlement information by using its local database prior to sending these blocks to the host computer. If no change was made to the authorized transaction (e.g., no tip was added) then the adapter only needs to send the database index code and minimal other information in order to post the transaction. If a change was made to the transaction, then the adapter sends the database index code and a small block of data which updates the transaction.

14 Claims, 16 Drawing Sheets

| RECORD TYPE | APPLICATION TYPE | DELIMITER | BANK ID | MERCHANT ID | STORE NUMBER |
|---|---|---|---|---|---|
| 1 BYTE | 1 BYTE | 1 BYTE | 6 BYTES | 12 BYTES | 4 BYTES |

| TERMINAL NUMBER | INDUSTRY CODE | CURRENCY CODE | COUNTRY CODE | ZIP CODE | LANGUAGE CODE |
|---|---|---|---|---|---|
| 4 BYTES | 2 BYTES | 3 BYTES | 3 BYTES | 9 BYTES | 2 BYTES |

| TIME ZONE | MERCHANT CATEGORY CODE | FLAGS | SEQUENCE NUMBER | FIELD SEPARATOR (FS) |
|---|---|---|---|---|
| 3 BYTES | 4 BYTES | 1 BYTE | 4 BYTES | 1 BYTE |

| CARDHOLDER INFORMATION | FS | CARD NUMBER | FS | AMOUNT | FS |
|---|---|---|---|---|---|
| 1–32 BYTES | 1 BYTE | 12–16 BYTES | 1 BYTE | 4–12 BYTES | 1 BYTE |

| EXPIRATION DATE | TRANSACTION-SPECIFIC INFORMATION | CHECK CODE |
|---|---|---|
| 4 BYTES | 5–105 BYTES | 1 BYTE |

FIGURE 5

| RECORD TYPE 1 BYTE | APPLICATION TYPE 1 BYTE | BANK ID 6 BYTES | MERCHANT ID 12 BYTES |
|---|---|---|---|
| TERMINAL NUMBER 4 BYTES | | BATCH FLAGS | |
| OTHER BATCH HEADER INFORMATION | | | CHECK CODE 1 BYTE |

FIGURE 6

| AUTHORIZED/DENIED STATUS | AUTHORIZATION CODE | |
|---|---|---|
| DATABASE INDEX CODE | BATCH TRANSACTION RECORD CHECK CODE | |
| OTHER REPLY INFORMATION | | |

FIGURE 8

APPARATUS AND METHOD FOR BATCH PROCESSING OF WIRELESS FINANCIAL TRANSACTIONS

TECHNICAL FIELD

The invention relates to the field of financial transaction processing, and more particularly with financial transactions that are processed over a wireless transmission system. An additional related field is the field of data compression.

BACKGROUND OF THE INVENTION

Conventional financial transaction processing methods and systems use a terminal, such as the ubiquitous Tranz 330 terminal manufactured by Verifone Corp., and a dialup telephone line to process financial transactions. A merchant provides the terminal, by entry of data on the keypad of the terminal and/or by running a credit or debit card through a magnetic track reader incorporated in the terminal, with information which describes a requested financial transaction. The terminal then uses the public switched telephone network to establish a connection with a host computer, transmits the information describing the financial transaction, receives a reply from the host computer relating to the requested financial transaction, acknowledges receipt of the reply from the host computer, and terminates the connection with the host computer. The terminal then provides, on its display, an approval or denial code or other relevant information relating to the requested financial transaction.

Although the transaction may have been authorized, another step is undertaken in order to settle the transaction. For example, a customer may be prepared to make a purchase and the customer's credit card purchase is authorized, but then the customer changes his mind and then does not make the purchase, or changes the amount of the purchase by adding a tip to the charge. Thus another set of transactions is undertaken, usually at a specific time of the day, to settle the day's transactions, posting all authorized and executed transactions, with their final amounts, at the host computer. This settlement is often referred to as "batch" processing, since all of the day's transactions are sent as a single batch of transactions on one phone call, rather than having a single transaction for each phone call to the host computer.

When the dialup connection is established between the terminal and the host computer, a path is established which allows data to be bi-directionally transmitted between the terminal and the host computer. Charges for dialup telephone access are assessed based on the type of call and the duration of the call. The dialup telephone access is often a "local" call, with no long-distance charges assessed. Some business phone lines, which a merchant might have, provide unlimited local calling, while other business phone lines are on measured service, wherein the duration of local calls is accumulated and used to calculate the phone bill. Occasionally the dialup access is provided via a "1-800" Wide Area Telephone Service (WATS) line, for the use of which the merchant is not directly charged by the phone company which provides the telephone service. Only rarely is the dialup access provided via a long-distance call. The dialup access is often a local call with unlimited service, or a measured-rate local call with a low per/minute billing rate. Thus, the duration of each telephone call to process a financial transaction and the amount of data that is transmitted in processing a financial transaction either do not affect the charges associated with the dialup telephone access or only produce minimal additional costs for the telephone service. The additional steps of the batch settlement do not add significantly to the phone call charges which a merchant may incur, since the phone call is usually a local call or a WATS call.

In contrast to local dialup telephone service, wireless telephone services, such as the analog or digital cellular telephone systems, and wireless data services, such as the Cellular Digital Packet Data (CDPD) network, assess charges based on the connection time, or number of data packets that are transmitted.

Some attempts have been made to use conventional financial transaction processing systems and methods with analog cellular telephone services. One method involves coupling the audio signals between the financial transaction device and an analog cellular telephone via an acoustic coupler, with the merchant hand-dialing the phone number of the host computer on the cellular telephone keypad. Motorola has manufactured cellular telephones with a built-in telephone jack and circuitry which adapts the cellular telephone so that it may be operated as if it were a land-line telephone, and the financial transaction terminal could be connected to this cellular telephone and used without modification to the conventional system and methods.

However, cellular telephone connections incur significant charges due to the lengthy time of the cellular telephone connection establishment and the lengthy time which the connection must be maintained in order to process the financial transaction. The time during which the connection between the terminal and the host computer is being established may be charged for by the cellular carrier, which may result in charges for 10–20 seconds of cellular air-time for each transaction processing request even while no financial transaction processing is actively occurring. Additionally, many cellular carriers charge for connection time on a whole-minute basis, so that a cellular telephone call which had a duration of only 20 seconds may be billed at a rate as if the cellular telephone call lasted for an entire minute. If the cellular telephone call lasts for one minute and one second, the charge for the cellular telephone call may be billed at the rate for two whole minutes.

Simply changing from the analog cellular telephone system to a digital data system, such as the Cellular Digital Packet Data (CDPD) network, does not eliminate the additional charges incurred with a wireless transmission system. Even if the terminal could be made to directly address a CDPD wireless modem to provide a connection to the host computer, transmit the requested financial transaction and receive the response from the host computer, the conventional systems and methods of financial transaction processing would incur significant charges due to the number of data packets which are transmitted by conventional methods. Conventional methods may require packets to establish the connection between the terminal and the host computer and start the transaction process, one or two data packets to transmit the requested financial transaction, one or two packets to provide the response for the requested transaction, one data packet to acknowledge receipt of the response from the host computer, and more data packets to close the connection. If there are transmission errors or synchronization errors which require re-transmission of data packets the total number of data packets per requested financial transaction rises further.

Conventional batch settlement processing systems and methods are not efficient when used with wireless transmission systems. What is needed is a method of optimizing financial transactions, including the batch settlement transactions, which are generated by conventional transaction processing equipment for efficient use with wireless transmission systems.

It is an object of the invention to provide a method of settlement batch processing which may be used when a conventional financial transaction processing point-of-sale terminal is used with a wireless transmission system.

It is a further object of the invention to provide a method of settlement batch processing so as to minimize the number of data packets transmitted in the settlement batch processing.

It is a still further object of the invention to provide a method of settlement batch processing in a manner such that no changes to the operation of the terminal need to be made in order to use the method of the invention.

A still further object of the invention is to provide methods which may be used to determine if a conventional financial transaction processing point-of-sale terminal is requesting a single transaction authorization or a settlement batch process.

SUMMARY OF THE INVENTION

Briefly, the invention provides an adapter to be used with a conventional financial transaction processing point-of-sale terminal and a wireless modem. The adapter receives a data block from the terminal indicative of a requested financial transaction. The adapter transmits information relating to the requested transaction to a host computer, which authorizes the transaction. The host computer logs the requested transaction and its reply to a database in the host computer. The host computer then transmits the reply, along with database indexing information and a check code, to the adapter. The adapter logs the transaction to a database in the adapter, and then transmits the reply to the terminal, which concludes the transaction.

When the settlement batch processing is to be performed, the merchant initiates the batch processes by pressing certain keys on the keypad of the terminal. Instead of making a modem connection with the host computer and transferring the batch information, the terminal makes a modem connection with the adapter and transfers the batch information to the adapter. The adapter uses the check codes and database index information in its database to determine the database index of the authorization reply to each transaction being transferred in the batch process. If the transaction is to be settled as processed, (e.g., no tip was added, no change in price, etc.) then the adapter transmits to the host computer a compressed data block which includes the database indexing information assigned by the host computer when the transaction was authorized. If the transaction has been changed, then a new check code is calculated by the adapter on the new transaction and a compressed data block is transmitted to the host which contains the database indexing information, a check code on the new transaction information, and the changed transaction information. Using this method the number of data packets transmitted to the host to perform the settlement batch process is greatly reduced.

Another aspect of the invention provides methods that the adapter uses to determine if the terminal is requesting a single transaction process or the settlement batch process.

Still another aspect of the invention provides methods for the adapter to determine if the terminal is requesting a single transaction process or the settlement batch process, prior to the transmission from the terminal to the adapter of any of the batch processing or transaction request information.

BRIEF DESCRIPTION OF THE DRAWINGS

FIG. 5 shows an example of a data block which may be transmitted by the terminal when requesting authorization of a requested financial transaction.

FIG. 6 shows an example of a data block which may be transmitted by the terminal when requesting the initiation of the settlement batch process.

FIG. 8 shows an example of a reply from the host computer, showing the authorization status and authorization code, a database index code and batch transaction record check code, along with other reply information.

DETAILED DESCRIPTION OF THE INVENTION

Figure 1:
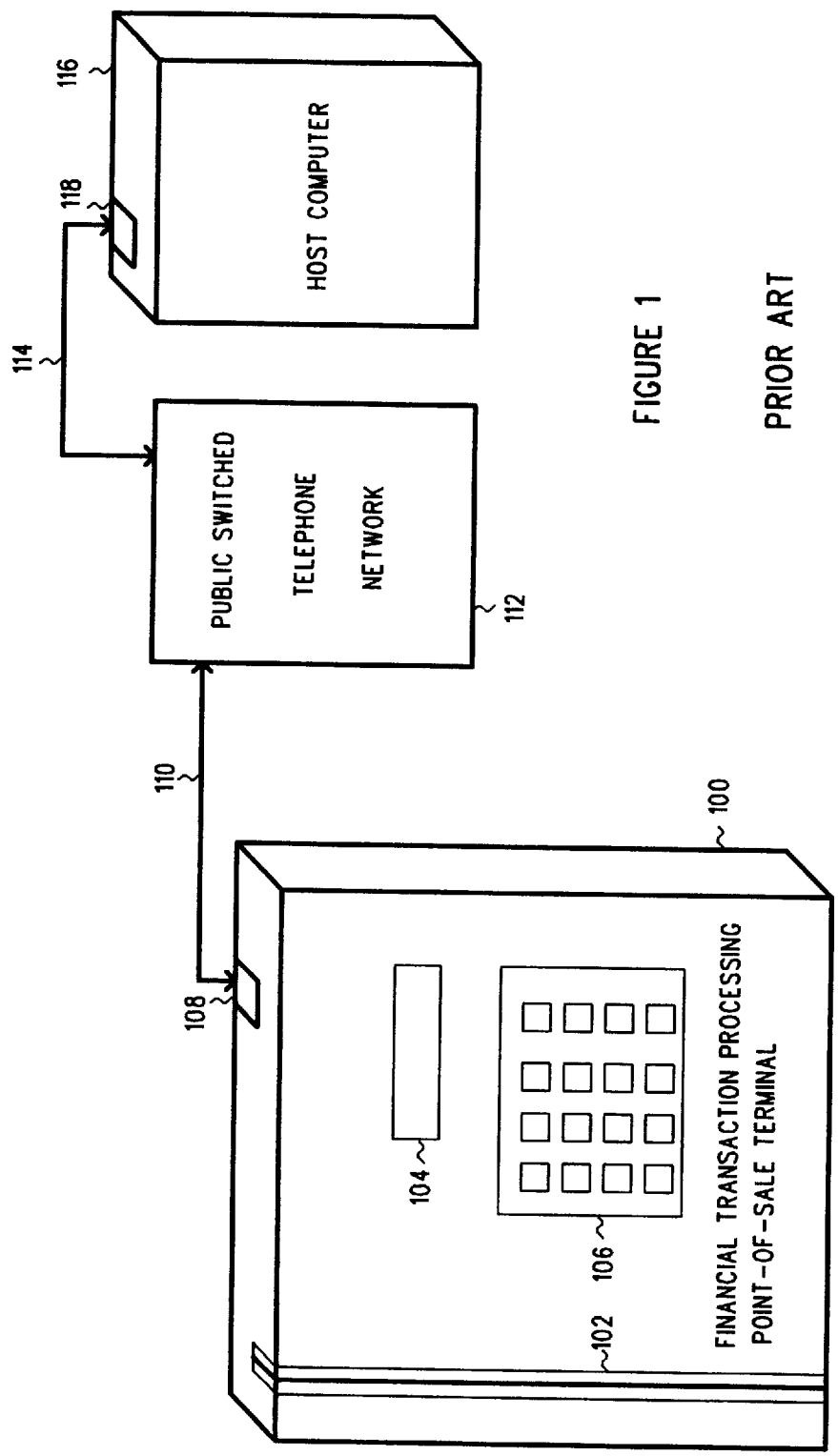
FIG. 1 shows a prior art financial transaction processing point-of-sale terminal communicating with a host computer via a public switched telephone network.

In FIG. 1 a prior art system for processing financial transactions is shown. The financial transaction processing point-of-sale terminal 100 communicates with a host computer 116 via a public switched telephone network 112. The terminal 100 has a keypad 106, a display 104, a magnetic card stripe reader 102 and a telephone line connector 108. The terminal 100 has a modem (not shown) which is connected internally to the telephone line connector 108.

Figure 2:
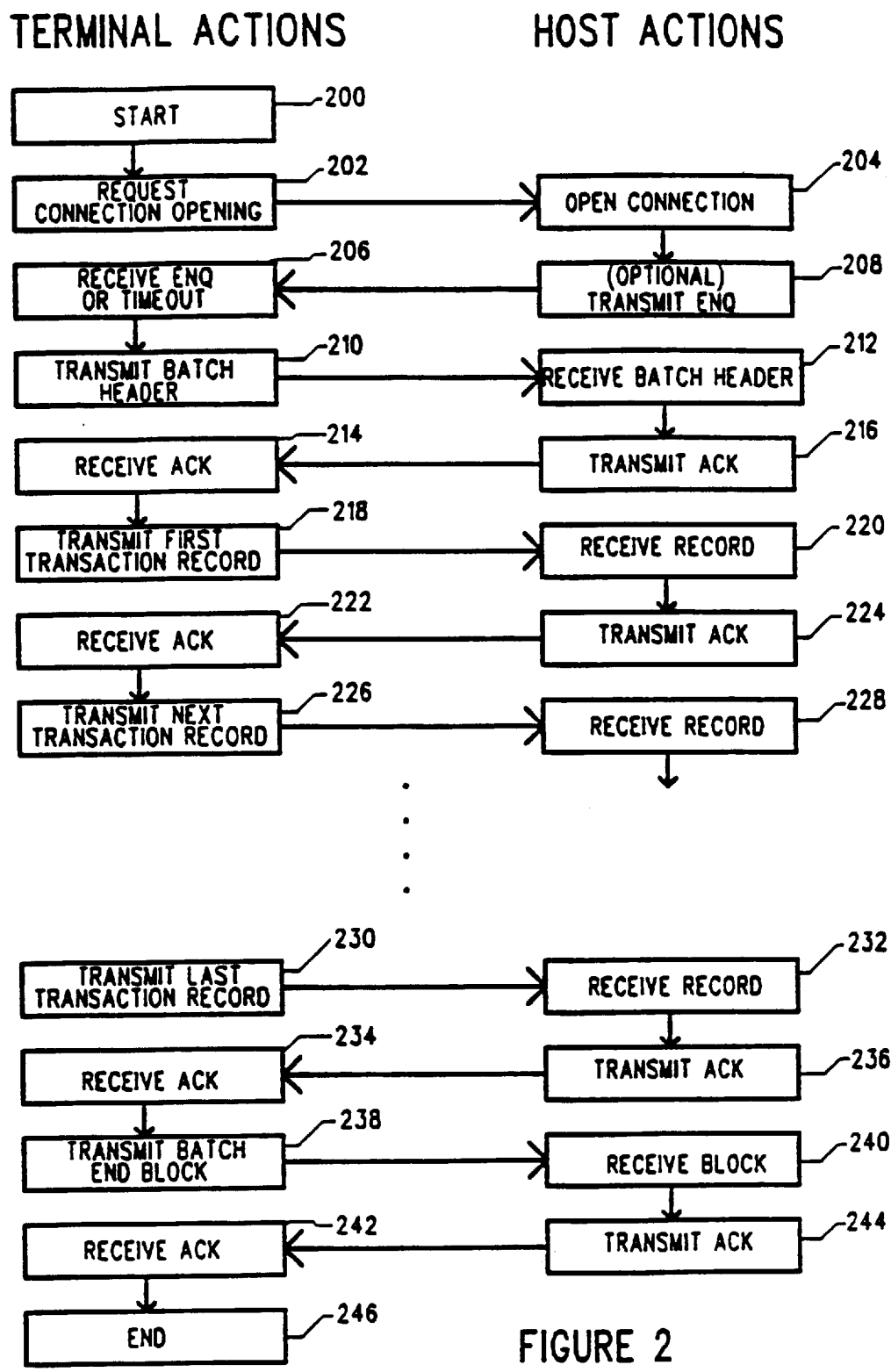
FIG. 2 shows a prior art method of processing a settlement batch process, with the transmission of many data packets between the terminal and the host.

FIG. 2 shows the method used in the conventional system for settlement batch processing of authorized financial transactions. The terminal 100 establishes a modem connection with the host computer 116 via a public switched telephone network 112 in steps 202 and 204. The terminal 100 then transmits a batch header in step 210 with identifying information and the settlement batch processing request to the host computer 116. The host computer 116 sends an ACK character to acknowledge receipt of the batch header in step 216.

The terminal 100 then transmits in step 218 the first transaction record of the batch process, which contains the first authorized transaction. The host computer 116 receives this record in step 220 and then transmits an ACK character to the terminal 100, in step 224. The terminal 100 receives the ACK in step 222. The terminal 100 then transmits the next transaction record of the batch process in step 226, and the host computer 116 again receives the record in step 228 and transmits an ACK character to the terminal. These steps are repeated until all of the batch transaction records have been transmitted by the terminal 100 to the host computer 116, and ACKed by the host computer 116.

The transmission of the transaction records by the terminal 100, and their acknowledgment by the host computer 116 continues until all transaction records for the authorized transactions have been transmitted to the host computer 116. The terminal 100 then transmits a batch end block in step 238, receives an acknowledgment to the batch end block in step 242 from the host computer 116 and terminates the modem connection with the host computer 116.

It should be noted that many data transmission steps are undertaken to transmit the settlement batch records for the authorized transactions to the host computer 116. Each transaction record requires two transmission steps, one to the host computer 116 and another from the host computer 116 to the terminal 100.

Figure 3:
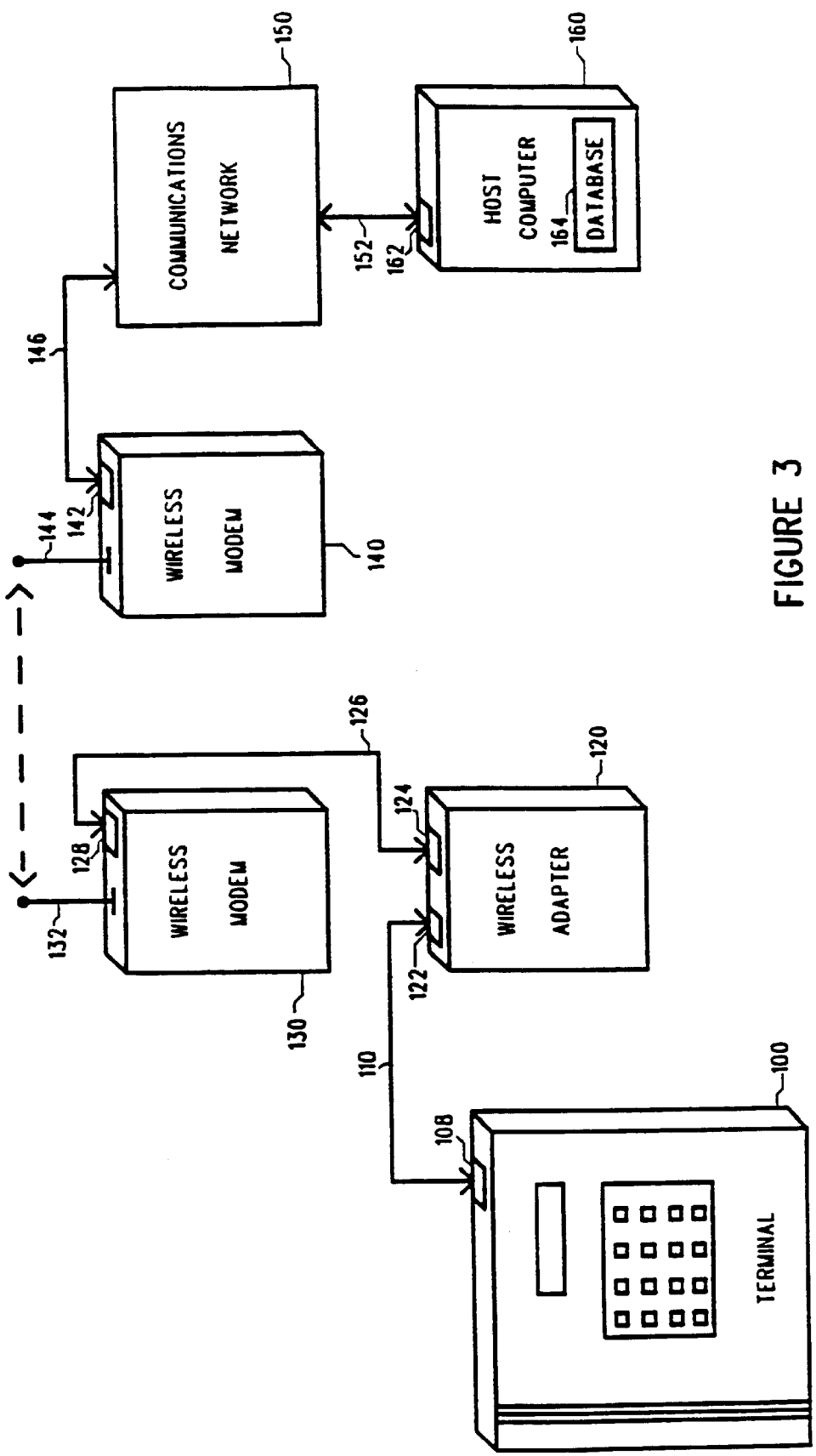
FIG. 3 shows a wireless adapter of the invention connected to a terminal and a first wireless modem, and a second wireless modem connected to the host computer via a communications network, with the host computer also shown having a database.

FIG. 3 shows the terminal 100 connected to a wireless adapter 120 of the invention. The wireless adapter 120 is shown having a phone line connector 122 and a data transmission interface 124. The wireless adapter 120 is also connected to a first wireless modem 130. The first wireless modem 130 may be a Cellular Digital Packet Data (CDPD) modem or other wireless modem. The first wireless modem 130 is shown in communication with a second wireless modem 140. In the case where the wireless modems 130 and 140 are CDPD modems, the second wireless modem 140 is located at a cellular transmission site (not shown) and is a part of the cellular transmission CDPD network. The invention will be described in reference to a preferred embodiment when a CDPD modem is used with the wireless adapter 120, although those skilled in the art will recognize that another wireless modem may be used with the wireless adapter 120 and methods of the invention. The wireless modems are shown each having a data interface, 128 and 142 respectively, and an antenna, 132 and 144 respectively.

The connection of the terminal 100 to the wireless adapter 120 is provided by a phone line cable 110 which connects to the phone line connector 108 on the terminal 100 and a phone line connector 122 on the wireless adapter 120. The connection of the wireless adapter 120 to the first wireless modem 130 is provided by a data cable 126 which connects to the data transmission interface 124 of the wireless adapter 120 and to the data interface 128 of the wireless modem 130.

The second wireless modem 140 is connected to a communications network 150. This communications network 150 may be a local area network, a wide area network, a packet switching network or other communications network which may also use a public switched telephone system for data transmission. Communications networks are given to be well known in the field and are thus not described in detail herein.

A host computer 160 is also shown connected to the communications network 150. The host computer 160 communicates with the second wireless modem 140 via the communications network 150. Transmissions received by the second wireless modem 140 which are destined for the host computer 160 are transmitted to the host computer 160 by the second wireless modem 140 via the communications network 150. Transmissions made by the host computer 160, which are to be transmitted by the second wireless modem 140, are transmitted by the host computer 160 to the second wireless modem 140 via the communications network 150, and are then transmitted by the second wireless modem 140. The host computer 160 also has a database 164 for storage of processing data and status of financial transactions. Host computer 160 may be the same host computer 116 as shown in FIG. 1, or host computer 160 may be a different host computer which is used when the terminal 100 communicates with a host computer via the wireless adapter 120 of the invention and a wireless modem 130.

Figure 4:
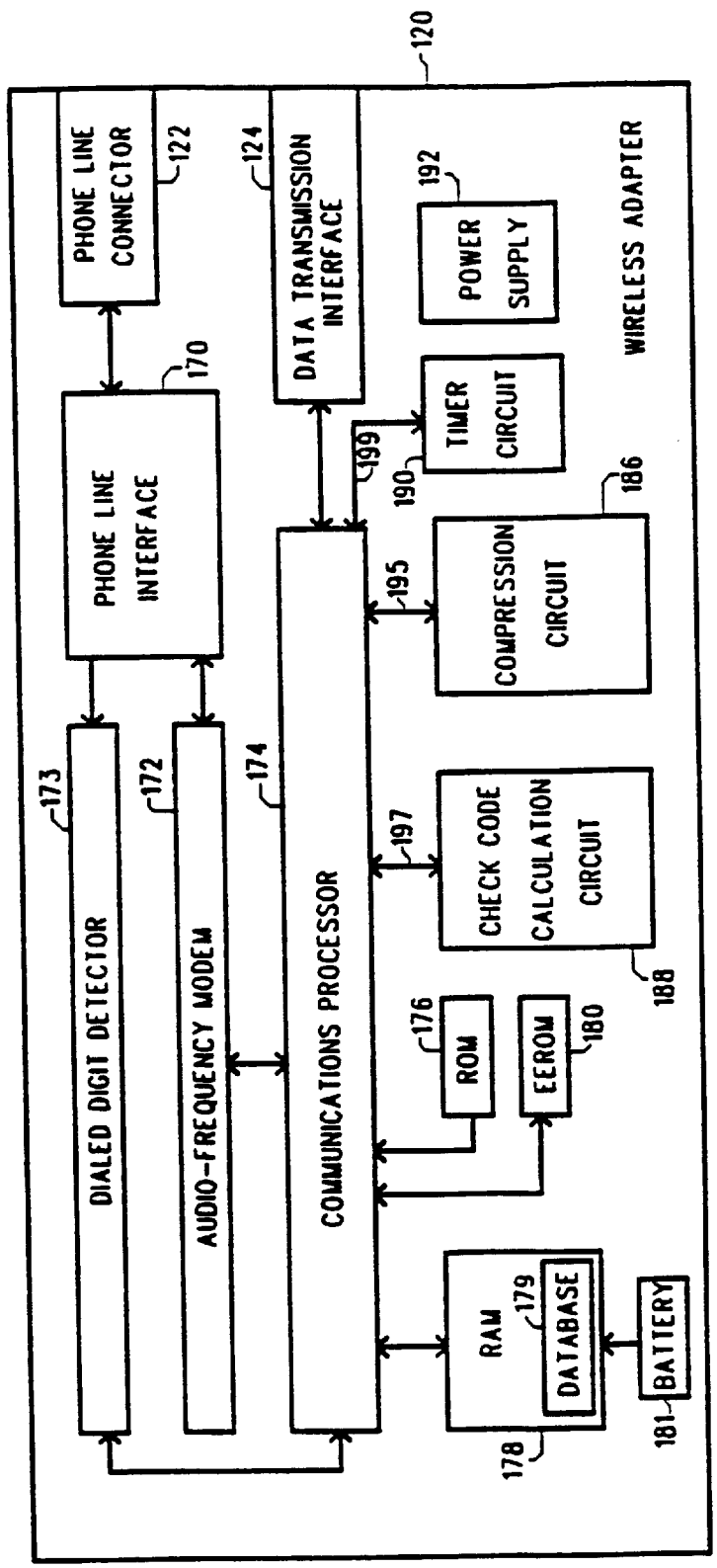
FIG. 4 shows a block diagram of the wireless adapter.

FIG. 4 shows a block diagram of the wireless adapter 120. A phone line connector 122 is provided for connection to the terminal 100. A phone line interface 170 provides loop current and two-to-four wire conversion for the phone line to the terminal 100. The adapter 120 has an audio frequency modem 172 which is used to establish a modem connection with the modem inside the terminal 100, via the phone line interface 170 and the phone line connector 122 of the adapter 120. A dialed digit detector 173 is also provided for detection of DTMF or pulse dialed digits.

The audio frequency modem 172 is coupled to a communications processor 174. The communications processor 174 is coupled to a ROM 176, a RAM 178 and an EEROM 180. The ROM 176 is for program storage, the RAM 178 is for data storage and data processing and the EEROM 180 is for storage of configuration settings and parameters. Those skilled in the art will recognize that Flash ROM or other EEROM may be used in the place of the ROM 176. The communications processor 174 may be a type 80186, manufactured by Intel Corporation, or other type of microprocessor or microcontroller. The ROM 176 may be a type 27C256, as manufactured by various manufacturers. The RAM 178 may be a type 43256 as manufactured by NEC Corporation. The EEROM 180 may be a type 29EE010 as manufactured by Silicon Storage Technologies, Inc., or by another manufacturer. The dialed digit detector 173 may be a type MT8870 as manufactured by Teltone Corporation.

The RAM 178 is shown with a backup battery 181, which provides backup power to maintain the contents of the RAM 178 in the event of a power failure. The RAM 178 is shown having a portion of the RAM 178 comprising a database 179.

The communications processor 174 is coupled to a data transmission interface 124. Typically the data transmission interface 124 will be a serial port and a serial port connector of the type commonly referred to as a male DB9 connector with a DTE configuration. Data transmission interfaces of this type are given to be well known in the field and are not described in detail herein. It should be noted that some microcontrollers or microprocessors may contain a communications processor and also may contain one or more serial ports which may be used as part of the data transmission interface 124 of the wireless adapter 120.

The adapter 120 also contains a compression circuit 186 which is coupled to the communications processor 174 by bus 195. The compression circuit 186 is used to compress data which is stored in the RAM 178 for transmission. The best method of providing the compression circuit 186 is to provide the communications processor 174 with stored instructions in the ROM 176 which cause the communications processor 174 to perform logical operations on a data block stored in RAM 178 to compress the data block. The compression circuit 186 uses database records stored in the database 179 of the RAM 178 of the adapter 120 to provide a highly compressed data block for transmission.

The wireless adapter 120 also contains a check code calculation circuit 188 which is coupled to the communications processor 174 by bus 197. The check code calculation circuit 188 may be constructed using shift registers and XOR gates to calculate a Cyclic Redundancy Check (CRC) code, in the conventional manner of calculating such codes. Alternatively, the check code calculation circuit 188 may be constructed using a stored instruction program in the ROM 176 which causes the communications processor 174 to perform logical operations on a data block stored in RAM 178 to generate a check code.

The wireless adapter 120 has a timer circuit 190, coupled to communications processor 174 by bus 199. The timer circuit 190 may be reset, started, stopped, and read by communications processor 174 via signals on bus 199. The timer circuit 190 may provide an interrupt signal on bus 199 in the conventional manner.

The wireless adapter 120 contains a power supply circuit 192 for the conversion of input power to the proper voltages for operating the wireless adapter 120.

The communications processor 174 is connected to the data compression circuit 186, the RAM 178, the ROM 176, the EEROM 180, timer circuit 190 and the check code calculation circuit 186 by busses. These busses may share common signals in the fashion well known in the art.

As shown in FIG. 3, the wireless adapter 120 is coupled to the terminal 100. Referring again to FIG. 4, the communications processor 174 receives a data block from the terminal 100 via the phone line connector 122, the phone line interface 170 and the audio frequency modem 172 of the adapter 120.

The communications processor 174 selectively provides the data block, or a copy thereof, to the check code calculation circuit 188 via the bus 197. The check code calculation circuit 188 returns a check code via the bus 197 to the communications processor 174.

FIG. 5 shows an example data block which may be transmitted by the terminal 100 when requesting authorization of a single transaction. The record type and application type fields hold values which indicate that the remainder of the data block is representative of a single authorization request. The program stored in the ROM 176 causes the communications processor 174 to examine the contents of the record type and application type fields of the received data block. If these fields match predetermined values, which indicate that the data block is a request for a single authorization request, then the communications processor 174 branches to the section of the program stored in the ROM 176 which processes the single authorization requests.

FIG. 6 shows an example data block which may be transmitted by the terminal 100 when requesting a settlement batch process. The record type and application type fields hold values which indicate that the remainder of the data block is representative of a settlement batch process. The program stored in the ROM 176 causes the communications processor 174 to examine the contents of the record type and application type fields of the received data block. If these fields match predetermined values which indicate that the data block is a request for a single authorization request, then the communications processor 174 branches to the section of the program stored in the ROM 176 which processes the settlement batch process.

Figure 7:
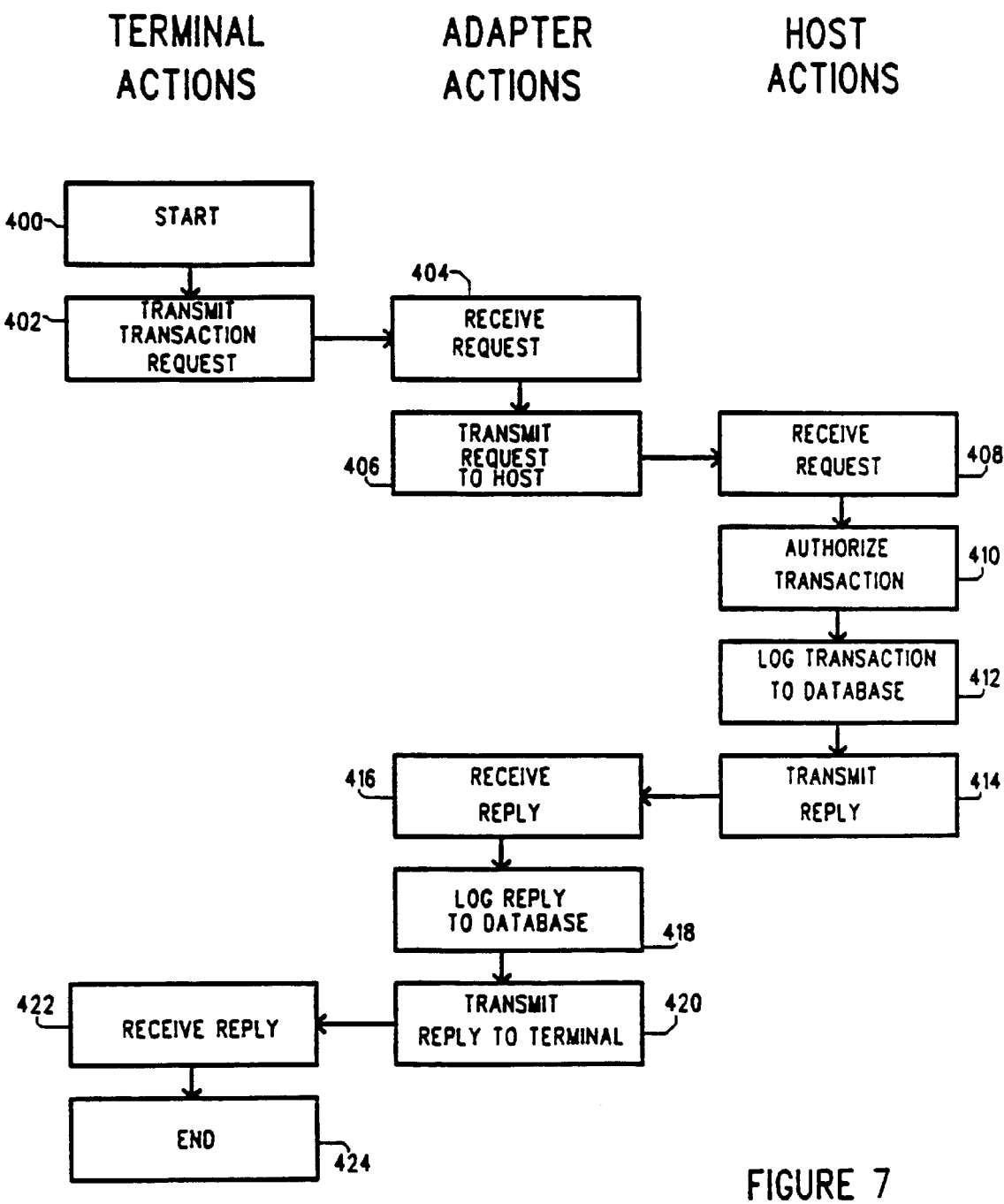
FIG. 7 shows a flow chart depicting the steps taken when a single transaction request is processed, including logging of the transaction in the database of the host computer and the database of the adapter.

FIG. 7 shows a flow chart depicting the steps taken when a single transaction is processed. The terminal 100 initiates a modem connection by taking its phone line connector 108 into the off-hook state by opening a relay, and then uses DTMF dialing to attempt to establish a connection with a host computer 160. The adapter 120, via its phone line connector 122, phone line interface 170, dialed digit detector 173 and audio frequency modem 172, establishes a modem connection with the terminal 100.

The adapter 120 may then optionally transmit an ENQ (Enquiry, ASCII 5) character to the terminal 100. In a preferred embodiment, the ENQ character is transmitted to the terminal 100 by the adapter 120 so that the terminal 100 can sense that the adapter 120 is ready for data. Some terminals may be set to not wait for the reception of the ENQ character prior to the transmission of the data block indicative of the requested financial transaction, and instead may wait a predetermined amount of time after the establishment of the connection to the adapter and then transmit the data block.

When the ENQ character is received by the terminal 100, or when the terminal 100 has waited its predetermined amount of time after the establishment of the connection to the adapter 120, the terminal 100 transmits either a data block indicative of a single authorization request or the first data block of a settlement batch process, in step 402.

When the terminal 100 transmits a transaction request, it is received by the adapter 120 via the audio frequency modem 172 in step 404. The adapter 120 transmits the request to the host computer 160 in step 406. The adapter 120 may perform optimizing steps (not shown) prior to transmission of the transaction request in order to optimize the transmission of the transaction request via the wireless transmission system.

The host computer 160 receives the request from the adapter 120 in step 408 and authorizes (or denies) the transaction in step 410. The host computer 160 logs the transaction to its database in step 412, and then transmits a reply to the adapter 120 via the wireless transmission system in step 414.

The adapter 120 receives the reply from the host computer 160 in step 416 and logs the reply to its database 179 in step 418. The adapter 120 now has stored in the database 179 in the RAM 178 a record of the authorized transaction. This information is stored for each authorized transaction and the stored information is later used to compress the settlement batch transaction records.

The host computer 160 may perform optimizing and compressing steps (not shown) on the reply prior to its transmission to the adapter 120. The adapter 120 may therefore need to perform conversion steps (not shown) on the reply received from the host computer 160 in order to format the reply such that it may be transmitted to the terminal 100.

The adapter 120 then transmits the reply to the terminal 100 in step 420.

When the terminal 100 receives the reply from the adapter 120 in step 422, it displays the reply on its display 104 and closes its modem connection, taking its phone line connector 108 into the on-hook state by opening its relay which was keeping the phone line connection of the terminal 100 off-hook. The adapter 120, via its phone line connector 122 and phone line interface 170, detects that the terminal 100 has gone back on-hook, and the communications processor 174 instructs the audio-frequency modem 172 to drop its carrier, thereby closing the connection.

FIG. 8 shows an example of a reply data block which may be transmitted by the host computer 160 to the adapter 120. The reply block contains a field for the authorized or denied status information, a field for an authorization code, a field for a database index code, a field for a batch transaction record check code and other reply information.

The authorized/denied status field indicates if the requested transaction is authorized or denied. By examining this field the adapter 120 may determine if a particular transaction was authorized or denied.

The authorization code field typically carries an authorization number, which is often displayed by the terminal 100 once the reply is received by the terminal 100.

The database index code is a reference code, which may be used by the host computer 160 to look up a particular authorized transaction. This code is stored in the database 179 in the RAM 178 of the adapter 120 by the communications processor 174 so that the compression circuit 186 may later use this index code to make reference to an authorized transaction. The database index code identifies a single transaction which was received by the host computer 160 from a specific wireless adapter 120.

The batch transaction record check code is also stored in the database 179 in the RAM 178 of the adapter 120 by the communications processor 174 so that by the communications processor 174 may check a calculated code received from the check code calculation circuit 188 against the batch transaction record check code stored in the database 179 in the RAM 178.

The other reply information may also selectively be stored in the database 179 in the RAM 178 of the adapter 120.

Figure 9:
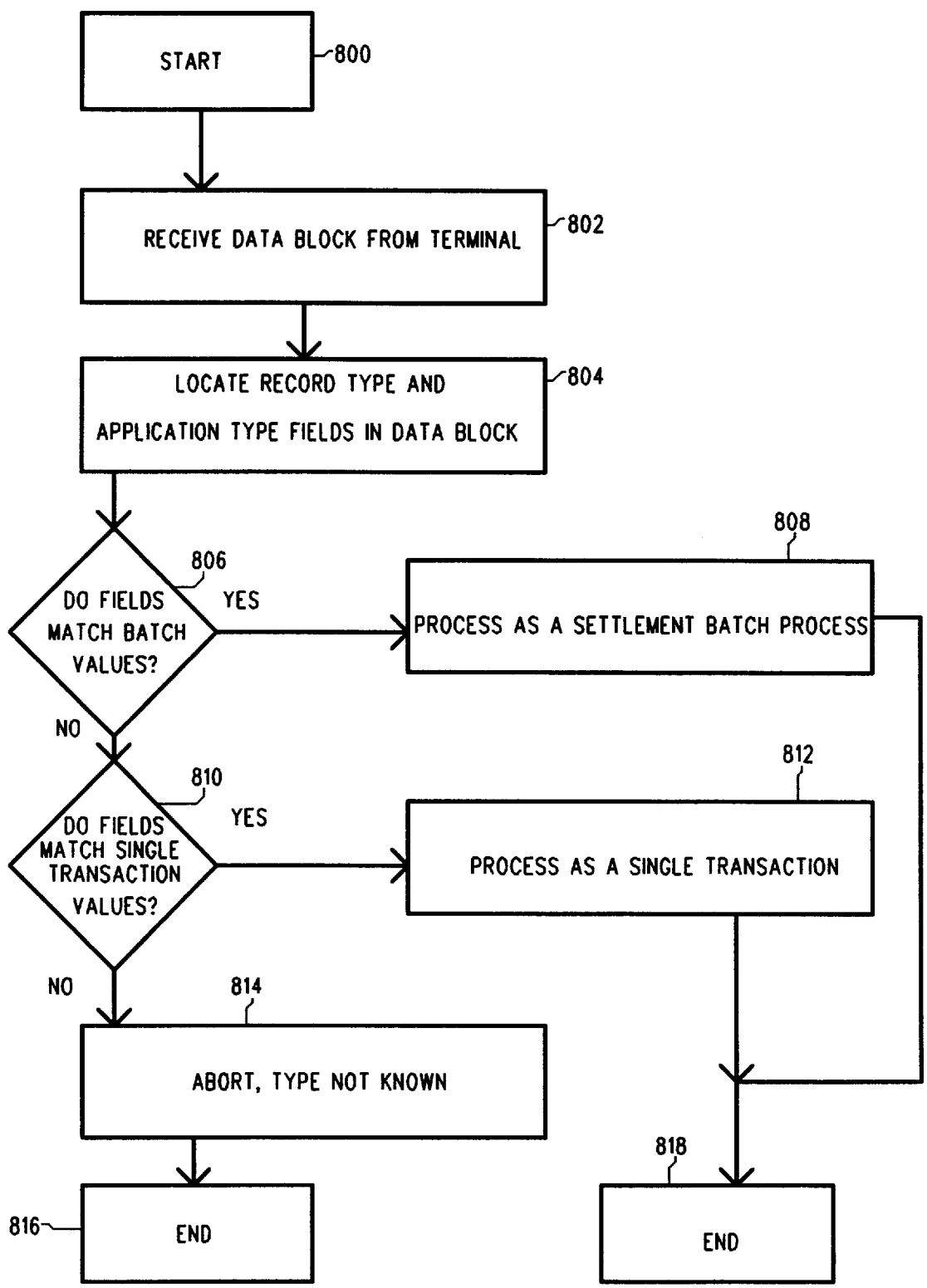
FIG. 9 shows a flow chart depicting the steps taken to determine if a data block received from the terminal is requesting a single transaction process or a settlement batch process.

FIG. 9 shows a flow chart depicting the steps taken by the adapter 120 to analyze a data block received from the terminal 100 to determine if the data block is a single authorization request or the start of a settlement batch process. First the communications processor 174 receives the data block, according to the steps previously described herein in step 802. The communications processor 174 then examines the record type and application type fields of the data block in step 804, and decision steps 806 and 810. These fields contain one set of values when the data block is for a single authorization request, and another set of values when the data block is for a settlement batch process request. The communications processor 174 compares the values of these fields against predetermined values in decision steps 806 and 810. The predetermined values may be stored in the ROM 176 or the EEROM 180. If a match of the values to the single authorization request values is found, then the communications processor 174 processes the request as a single authorization request in step 812. If a match of the values to the settlement batch process request values is found, then the communications processor 174 processes the request as a settlement batch process request in step 808.

If the field values do not match either set of predetermined values, then the type is unknown, and the adapter 120 aborts the processing, as shown in step 814.

Figure 10:
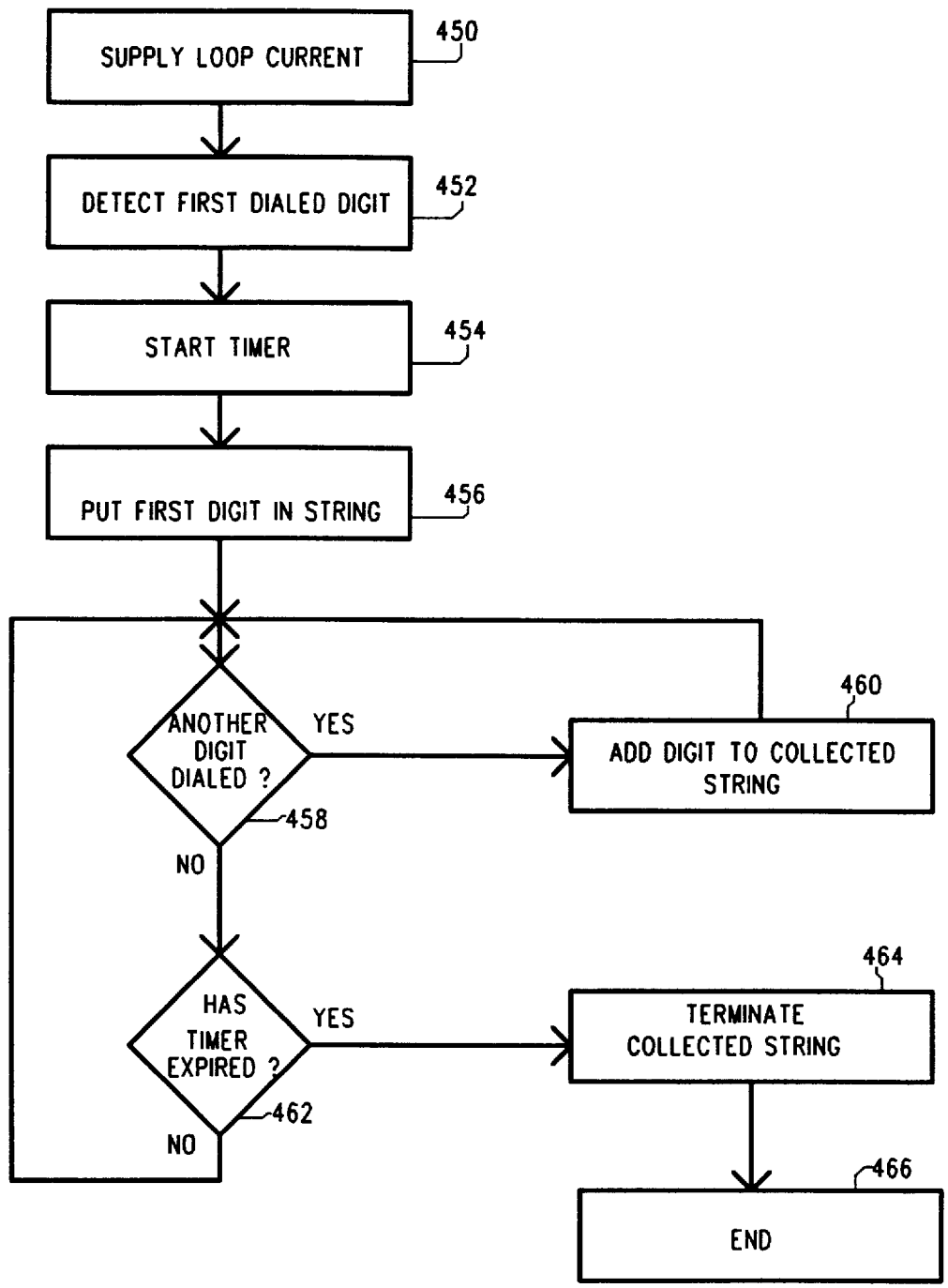
FIG. 10 shows a flow chart depicting the steps taken to collect a string of dialed digits from the terminal.

FIG. 10 shows a flow chart depicting the steps taken by the adapter 120 to collect the string of digits dialed by the terminal 100. First loop current is applied by the phone line interface 170 to power the phone line interface of the terminal 100 in step 450. The adapter 120 then waits for a signal from the dialed digit detector 173 which indicates that the first dialed digit has been received in step 452. The adapter 120 then starts timer circuit 190 in step 454.

The communications processor 174 of the adapter 120 places the first digit of the dialed digit string into the RAM 178 in step 456. The communications processor 174 then checks the dialed digit detector 173 to determine if another digit has been dialed in decision step 458. If so, the digit is added to the string in RAM 178 in step 460. The communications processor 174 then returns to step 458 to determine if another digit has been dialed.

If no other digit has been dialed, the communication processor 174 checks to see if the timer of timer circuit 190 has expired in decision step 462. If not, the communications processor 174 returns to the step of checking for another dialed digit in decision step 458. If the timer of timer circuit 190 has expired, as determined in decision step 462, then the collected string collection is terminated in step 464, (this is conventionally accomplished by appending a null character to the string) and the collection of the dialed digit string is complete.

Figure 11:
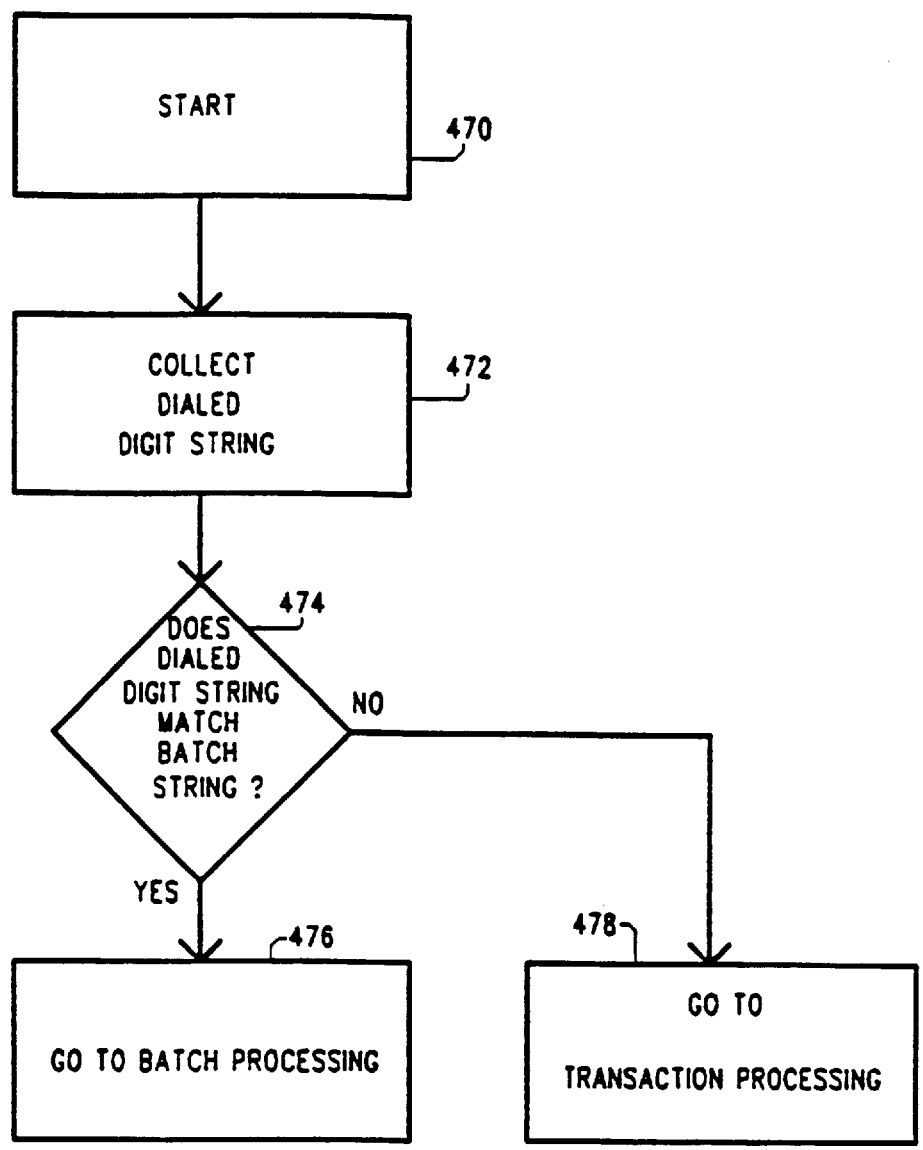
FIG. 11 shows a flow chart depicting the steps taken to determine if the dialed string of digits matches the batch dialing string, and the selection of batch processing thereby.

FIG. 11 shows a flow chart depicting the steps taken by the adapter 120 according to one method of the invention to determine that the terminal 100 is attempting to enter a settlement batch processing mode. The communications processor 174 collects the dialed digit string from the terminal 100 in step 472. The communications processor 174 then tests to see if the collected dialed digit string matches a predetermined batch string in decision step 474. If a match is found, then the communications processor 174 determines that the terminal 100 is attempting to enter a settlement batch processing mode, and the communications processor 174 goes to a settlement batch processing mode of operation in step 476. If no match is found, then the communications processor 174 determines that the terminal 100 is attempting to enter a single transaction request processing mode, and goes to a single transaction processing mode of operation in step 478.

Figure 12:
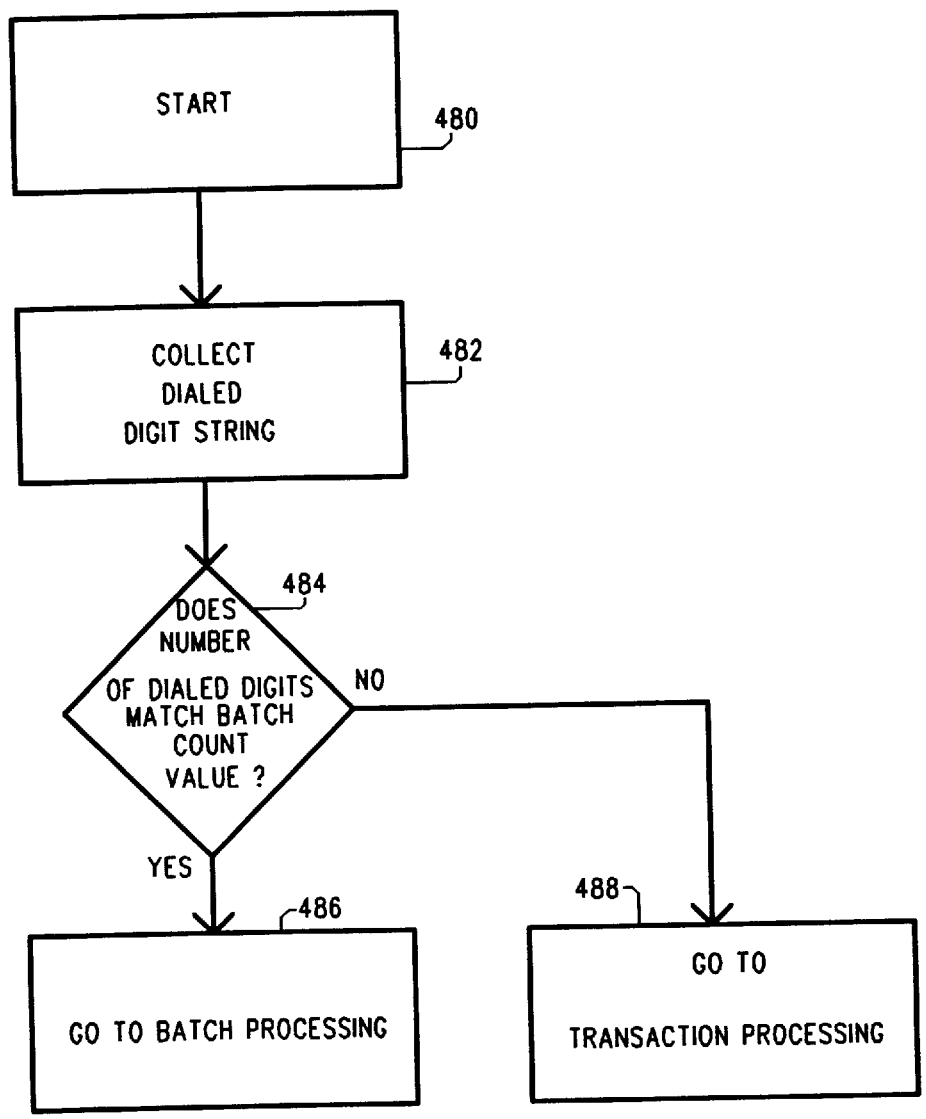
FIG. 12 shows a flow chart depicting the steps taken to determine if the dialed string of digits has the same number of digits as the batch count value, and the selection of batch processing thereby.

FIG. 12 shows a flow chart depicting the steps taken by the adapter 120 according to another method of the invention to determine that the terminal 100 is attempting to enter a settlement batch processing mode. The communications processor 174 collects the dialed digit string from the terminal 100 in step 482. The communications processor 174 then tests to see if the number of digits in the collected dialed digit string matches a predetermined batch string length, in decision step 484. If a match of the length is found, then the communications processor 174 determines that the terminal 100 is attempting to enter a settlement batch processing mode, and goes to a settlement batch processing mode of operation in step 486. If no match of the length is found, then the communications processor 174 determines that the terminal 100 is attempting to enter a single transaction request processing mode, and goes to a single transaction processing mode of operation in step 488.

The methods shown in FIGS. 11 and 12 may be used by the adapter 120 to determine if the terminal 100 is attempting to enter a settlement batch process mode even before any transaction or batch data is transmitted by the terminal 100 and also before any modem connection is made between the terminal 100 and the adapter 120. These methods may provide the communications processor 174 with advance warning of the start of the settlement batch process.

Figure 13:
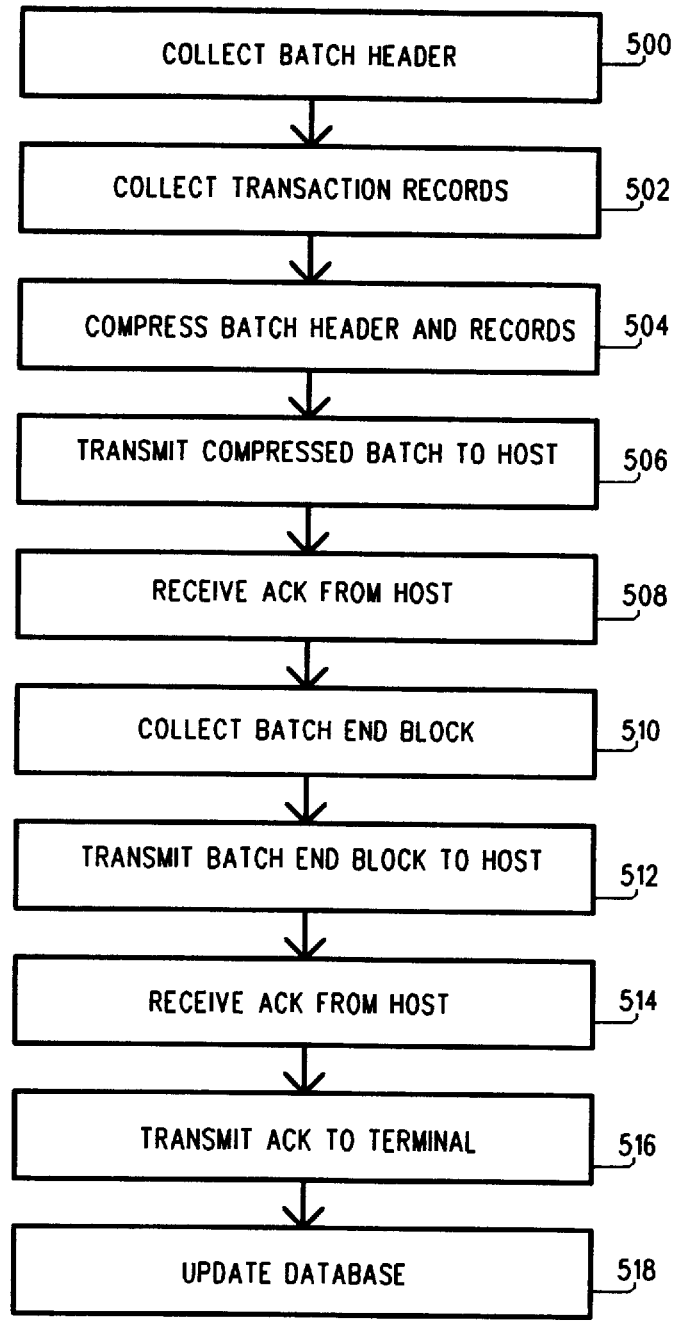
FIG. 13 shows a flow chart depicting the steps taken by the adapter of the invention in performing the settlement batch process.

FIG. 13 shows a flow chart depicting the steps taken in a method of batch processing of the invention. The adapter 120 collects the batch header from the terminal 100, in step 500, via the phone line connector 122, phone line interface 170, and the audio frequency modem 172. The communications processor 174 transmits ACK characters to the terminal 100 as needed to acknowledge receipt of the batch header.

The adapter 120 then collects the batch transaction records from the terminal 100 in step 502. Each transaction record is stored in RAM 178 as it is received by the communications processor 174. The communications processor 174 transmits ACK characters to the terminal 100 as needed to acknowledge receipt of the batch transmission records.

The communications processor 174 then uses the database 179 in the RAM 178, the check code calculation circuit 188 and the compression circuit 186 to produce a set of compressed data blocks which contain the batch header (which may be compressed) and compressed data indicative of the authorized transactions, in step 504.

The adapter 120 then transmits the compressed settlement batch process data blocks to the host computer 160 in step 506 and receives an acknowledgment from the host computer 160 once they have been successfully received by the host computer 160 in step 508.

The adapter 120 then collects the batch end block from the terminal 100 in step 510 and transmits this block, or a compressed copy thereof, to the host computer 160 in step 512. Transmission of the compressed data block can further include the step of encapsulating the compressed data block. The adapter 120 receives an acknowledgment from the host computer 160 when the batch end block is received in step 514. The adapter 120 then transmits the ACK for the batch end block to the terminal 100 in step 516, which completes the batch processing for the terminal 100.

The adapter 120 then updates its database 179 to clear the information for the authorized records which have now been settled, in step 518.

Figure 14:
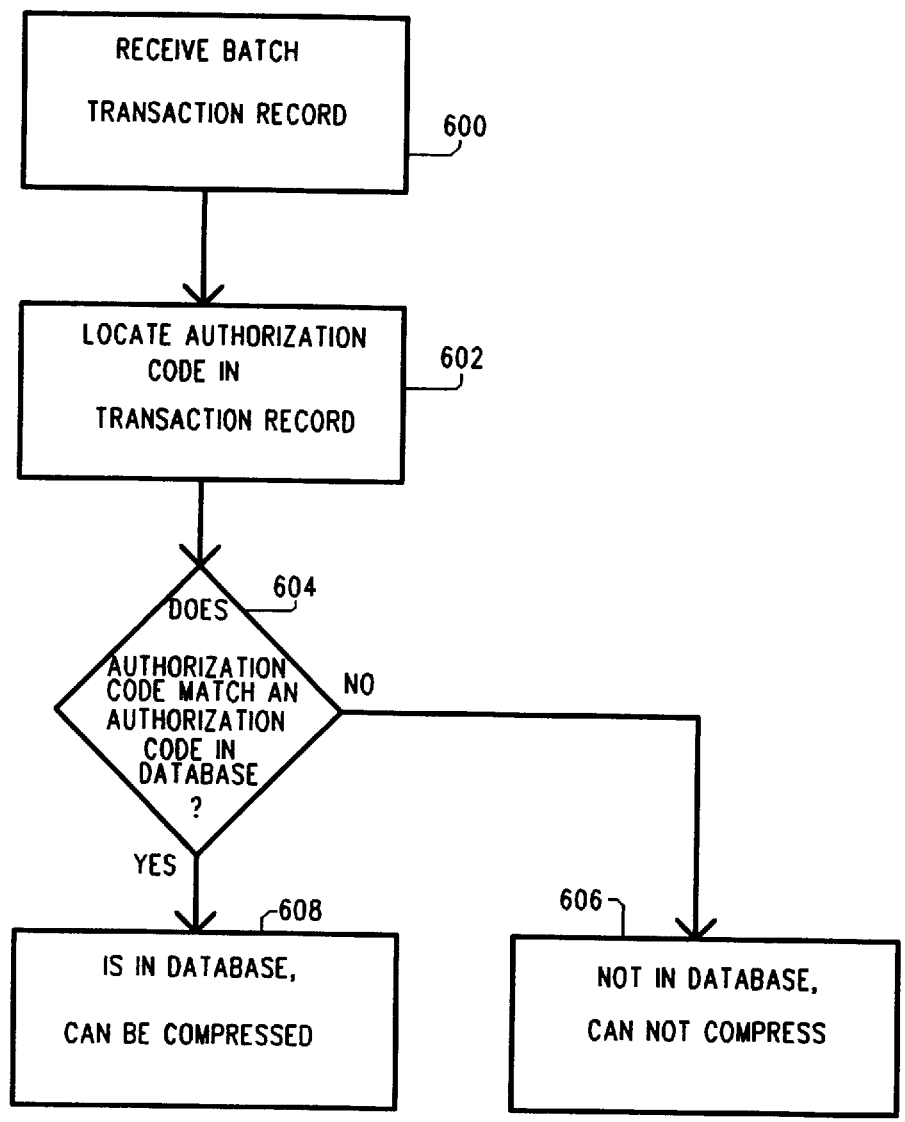
FIG. 14 shows a flow chart depicting the steps taken to determine if a batch transaction record in the settlement is in the database in the RAM.

FIG. 14 shows a flow chart depicting the steps taken to determine if a batch transaction record in the settlement is in the database 179 in the RAM 178. The communications processor 174 receives the batch transaction record for a single transaction and stores it in RAM 178 in step 600.

The communications processor 174 then locates in the RAM 178 the portion of the stored transaction record which holds the authorization code in step 602. The communications processor 174 then scans the database 179 in the RAM 178 looking for a matching authorization code which was stored when an authorized transaction reply was received from the host computer 160, in decision step 604. If no matching authorization code is found, somehow the transaction was not properly logged in the database 179. The settlement batch transaction record may be transmitted to the host computer 160, but without compression, as shown in step 606. However, if the authorization code was found in the database 179, then the settlement batch transaction record may be transmitted to the host computer 160 with data compression, as shown in step 608.

Figure 15:
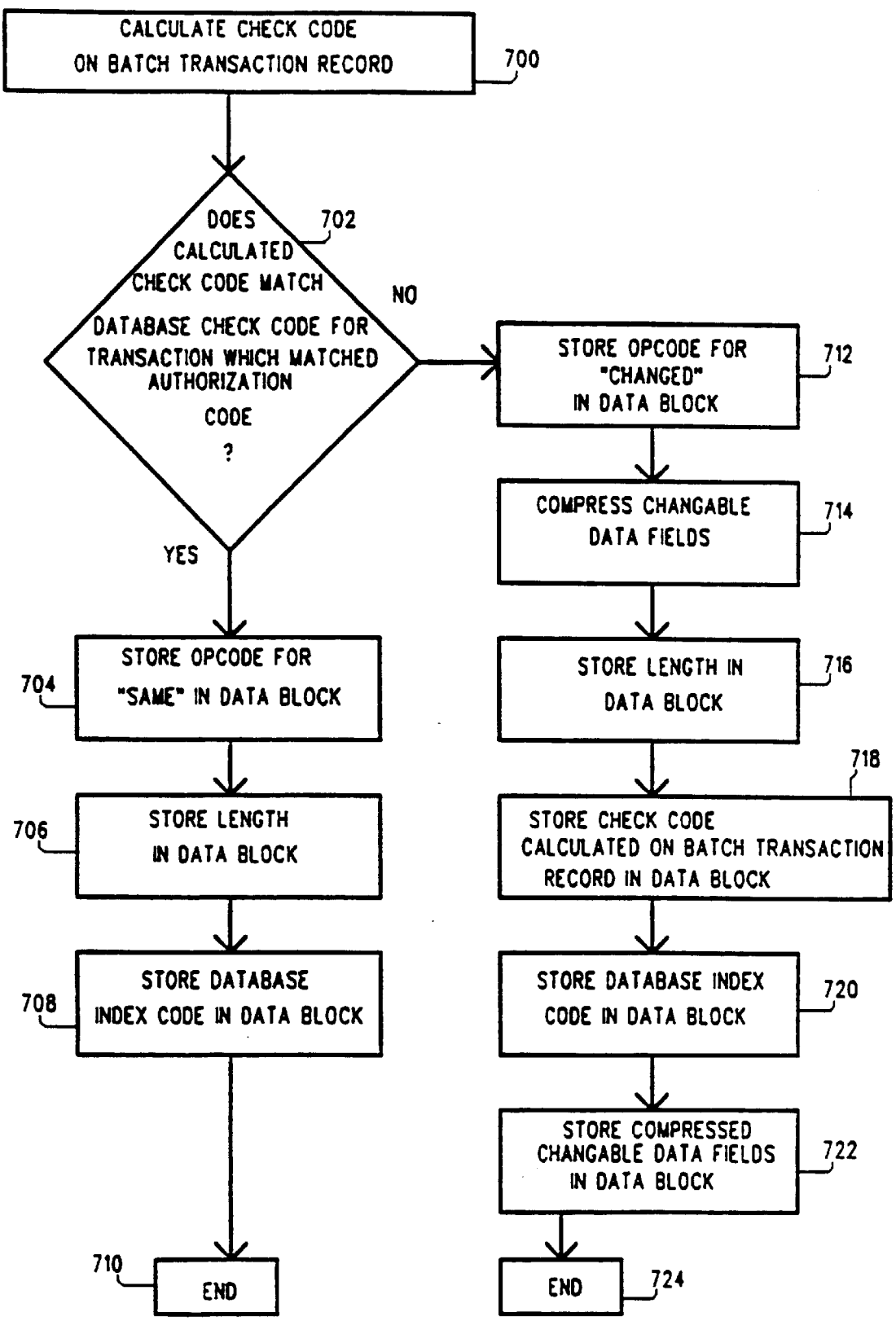
FIG. 15 shows a flow chart depicting the steps taken to compress the batch transaction records.

FIG. 15 shows a flow chart depicting the steps taken to compress the batch transaction records. First the communications processor 174 provides the batch transaction record, or a copy thereof, to the check code calculation circuit 188 via the bus 197. The check code calculation circuit 188 returns a check code via the bus 197 to the communications processor 174. The calculation of the check code is shown in step 700. The communications processor 174 checks, in decision step 702, if the check code calculated on the received batch transaction record matches the check code stored in the database 179 relating to this authorized transaction.

If the check codes match, then there was no change (e.g., price change, tip added, etc.) to the authorized transaction. The communications processor 174 places in the compressed data block in RAM 178 an opcode which indicates that the transaction is the same in step 704. The communications processor 174 then stores a length byte in the compressed data block in step 706 which points to the start of the next compressed transaction record. The communications processor 174 then reads the database 179 in the RAM 178 to determine the database index code which corresponds to the unchanged transaction, and stores the database index code in the compressed data block in step 708. This completes the compression of this batch transaction record. If a single byte is used for the opcode and a four-byte database index code is used, then the method of the invention compresses a batch transaction record, which typically is dozens of bytes, into only six bytes.

If the check codes do not match, then some change was made to the authorized transaction. In most cases this would be the addition of a tip to a restaurant or other service bill. The communications processor 174 stores in the compressed data block in RAM 178 an opcode for a changed transaction in step 712.

Only certain fields (e.g., amount of transaction) are permitted to change in an authorized transaction. Most data must remain constant for the authorized transaction to remain authorized. For example, the merchant identification number or store number must remain the same, or an authorized transaction for one store could then be altered and settled for another store. The communications processor 174 uses configuration information stored in the EEROM 180 or the ROM 176 to locate the changeable portions of the transaction record and compress the changeable portions in step 714. The communications processor 174 then writes to the compressed data block a length byte in step 716, which will point to the next compressed transaction record, after the compressed changeable data is written to the compressed data block.

The communications processor 174 writes in the compressed data block the check code calculated on the received batch transaction received so that errors in the transmission of the data may be detected in step 718. The communications processor 174 then reads the database 179 in the RAM 178 to determine the database index code which corresponds to the original transaction, and stores the database index code in the compressed data block in step 720. The communications processor 174 then writes to the compressed data block the compressed changeable data in step 722. This completes the compression of the changed transaction record. Although the compressed data is larger than six bytes, it is still much smaller than the original batch transaction record.

After all of the batch transaction records have been written to the compressed data block, the communications processor 174 writes an opcode for the end of the data to the compressed data block and the compressed data block is then transmitted to the host computer 160.

When the compressed data block is received by the host computer 160, the opcodes and database index codes may be used to locate the authorized transaction in the database 164 in the host computer 160. The opcodes, database index codes and compressed changeable data may be used to re-construct the batch transaction record at the host computer 160, which may be verified by the check code supplied with the compressed data block.

Figure 16:
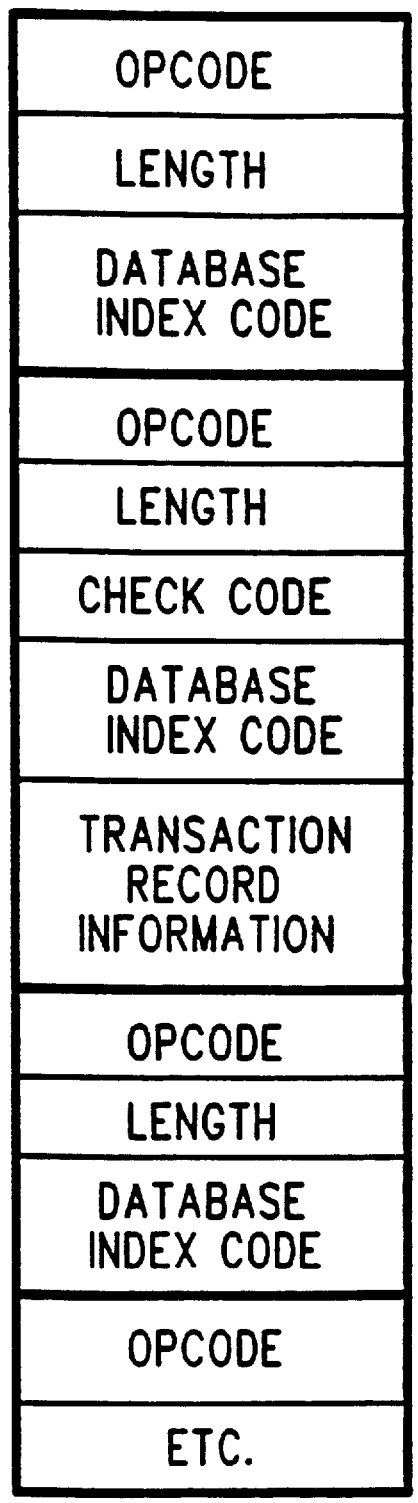
FIG. 16 shows an example of a compressed batch record, showing the opcode, length byte, database index code and, as needed, the new check code and the relevant transaction record information.

FIG. 16 shows an example of a compressed batch record, showing the opcode, length byte, database index code and, as needed, the new check code and the relevant transaction record information.

It has been shown that the invention provides a method of settlement batch processing which may be used when a conventional financial transaction processing point-of-sale terminal is used with a wireless transmission system.

It has further been shown that the invention provides the method of settlement batch processing in a manner which minimizes the number of data packets transmitted in the settlement batch processing, by providing a method of compressing the batch transaction records using a database.

It has still further been shown that the invention provides the method of settlement batch processing in a manner such that no changes to the operation of the terminal need be made in order to use the method of the invention. No reprogramming of the terminal is needed to operate the terminal using the method of the invention.

The individual components shown in outline or designated by blocks in the drawings are well known in the art and their specific construction and operation are not critical to the operation or best mode for carrying out the invention.

The invention has been described in reference to a particular embodiment, which is intended to be illustrative, rather than restrictive. Those skilled in the art will recognize changes or modifications which may be made to the particular described embodiment, with such changes or modifications falling under the spirit or scope of the invention, as described in the following claims.

What is claimed is:

1. An adapter for providing settlement batch processing when a conventional financial transaction point-of-sale terminal is used with a host computer that sends an authorization reply, in response to a request for a financial transaction, via a wireless transmission system, the adapter comprising:

a receiver that receives the authorization reply from the host computer;

a first memory that includes a database which stores at least a portion of the authorization reply;

a processor electrically connected to said first memory, said processor being programmed to:
  (1) collect a batch record, relating to an authorized transaction, from the terminal; and
  (2) locate in said database the stored portion of the authorization reply;

a compression circuit that compresses the batch record, relating to an authorized transaction, into a compressed data block based on the stored portion of the authorization reply; and a transmitter that transmits the compressed data block to the host computer.

2. The adapter of claim 1 wherein the database includes a database index code stored therein.

3. The adapter of claim 2 wherein said compression circuit compresses said batch record by storing in the compressed data block said database index code read from the database.

4. The adapter of claim 1 wherein the database includes a batch record check code.

5. The adapter of claim 4 wherein said compression circuit recognizes changes in an authorized transaction in the batch record using said batch record check code stored in the database.

6. The adapter of claim 1 wherein said compression circuit stores in said compressed data block an opcode indicative of a changed authorized transaction, a database index code and information indicative of changes made to said authorized transaction.

7. The adapter of claim 1 wherein said compression circuit stores in said compressed data block more than one compressed batch record.

8. A method of performing a settlement batch process when a conventional financial transaction point-of-sale terminal is used with a host computer via a wireless transmission system, the method comprising the steps of:

receiving in an adapter an authorization reply relating to a request for a financial transaction from the host computer;

storing at least a portion of the authorization reply in a database of a memory of the adapter;

collecting with a processor electrically connected with the memory a batch record, relating to an authorized transaction, from the terminal;

locating in the database with the processor the stored portion of the authorization reply relating to the request for a financial transaction;

compressing the batch record, relating to an authorized transaction, using a compression circuit of the adaptor into a compressed data block based on the stored portion of the authorization reply; and transmitting the compressed data block to the host computer.

9. The method of claim 8 wherein said step of storing at least a portion of the authorization reply in the database includes the step of storing a database index code in the database.

10. The method of claim 9 wherein said step of compressing the batch record includes the step of storing in the compressed data block the database index code read from the database.

11. The method of claim 8 wherein said step of storing at least a portion of the authorization reply in the database includes the step of storing a batch record check code in the database.

12. The method of claim 11 wherein said step of compressing the batch record includes the step of recognizing changes in an authorized transaction in the batch record using the batch record check code stored in the database.

13. The method of claim 10 wherein said step of compressing the batch record includes the step of storing in the compressed record an opcode indicative of a changed authorized transaction, a database index code and information indicative of the changes made to the authorized transaction.

14. The method of claim 8 wherein said step of transmitting the compressed data block further includes the step of encapsulating the compressed data block.

* * * * *